(12) United States Patent
Port

(10) Patent No.: US 11,489,886 B2
(45) Date of Patent: Nov. 1, 2022

(54) PROCESSING VIDEO INCLUDING A PHYSICAL WRITING SURFACE

(71) Applicant: Dolby Laboratories Licensing Corporation, San Francisco, CA (US)

(72) Inventor: Timothy Alan Port, Drummoyne (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/334,510

(22) Filed: May 28, 2021

(65) Prior Publication Data

US 2021/0360042 A1 Nov. 18, 2021

Related U.S. Application Data

(62) Division of application No. 16/642,744, filed as application No. PCT/US2018/053097 on Sep. 27, 2018, now Pat. No. 11,025,681.

(Continued)

(30) Foreign Application Priority Data

Sep. 27, 2017 (EP) ..................................... 17193442

(51) Int. Cl.
*H04N 7/15* (2006.01)
*H04L 65/1089* (2022.01)
(Continued)

(52) U.S. Cl.
CPC ........ *H04L 65/1089* (2013.01); *G06F 3/0425* (2013.01); *G06F 3/04886* (2013.01);
(Continued)

(58) Field of Classification Search
CPC ........ H04N 7/147; H04N 7/15; H04L 65/403; G06F 3/0425; G06F 3/0386;
(Continued)

(56) References Cited

U.S. PATENT DOCUMENTS 5,613,032 A 3/1997 Cruz
7,171,056 B2 1/2007 Zhang
(Continued)

FOREIGN PATENT DOCUMENTS

CN 102067579 A 5/2011
CN 104732211 B 12/2017
(Continued)

OTHER PUBLICATIONS

Zhengyou Zhang,"Computer Vision Technologies for Remote Collaboration Using Physical Whiteboards, Projectors and Cameras" IEEE Computer Vision for Interactive and Intelligent Environment, Nov. 17-18, 2005.

*Primary Examiner* — Melur Ramakrishnaiah

(57) ABSTRACT

A method of processing of a sequence of video frames from a camera capturing a writing surface for subsequent transmission to at least one of a remote videoconferencing client and a remote videoconferencing server. The method comprises receiving the sequence of video frames from the camera; and selecting an image area of interest in the video frames, comprising selecting one of a sub-area of the video frames and an entire area of the video frames. The method also comprises, for each current video frame of the sequence of video frames, generating a pen stroke mask by applying adaptive thresholding to the image area of interest. The method also comprises generating an output video frame using the pen stroke mask. Corresponding systems and computer readable media are disclosed.

8 Claims, 12 Drawing Sheets

Related U.S. Application Data

(60) Provisional application No. 62/563,719, filed on Sep. 27, 2017.

(51) Int. Cl.
- *G06F 3/042* (2006.01)
- *G06F 3/04886* (2022.01)
- *G06T 3/00* (2006.01)
- *G06T 5/00* (2006.01)
- *G06T 5/50* (2006.01)
- *H04L 65/403* (2022.01)
- *H04M 3/56* (2006.01)
- *H04L 65/75* (2022.01)

(52) U.S. Cl.
CPC ............ *G06T 3/0093* (2013.01); *G06T 5/002* (2013.01); *G06T 5/50* (2013.01); *H04L 65/403* (2013.01); *H04L 65/762* (2022.05); *H04M 3/563* (2013.01); *H04N 7/15* (2013.01); *G06T 2207/10016* (2013.01)

(58) Field of Classification Search
CPC ............ G06F 3/04883; G06F 3/03545; H04M 3/563; G06K 9/00416
USPC ............................................ 348/14.01–14.16
See application file for complete search history.

(56) References Cited

U.S. PATENT DOCUMENTS

| | | | |
|---|---|---|---|
| 7,224,847 B2 | 5/2007 | Zhang | |
| 7,496,229 B2 | 2/2009 | Zhang | |
| 8,019,175 B2 | 9/2011 | Lee | |
| 8,233,027 B2 | 7/2012 | Cheng | |
| 8,275,197 B2 | 9/2012 | Hawkins | |
| 8,493,431 B2 | 7/2013 | Liu | |
| 9,329,827 B2 | 5/2016 | Lavine | |
| 2001/0035976 A1 | 11/2001 | Poon | |
| 2004/0165786 A1 | 8/2004 | Zhang | |
| 2004/0263636 A1 | 12/2004 | Cutler | |
| 2005/0104864 A1 | 5/2005 | Zhang | |
| 2005/0281467 A1 | 12/2005 | Stahovich | |
| 2006/0139371 A1 | 6/2006 | Lavine | |
| 2007/0156816 A1 | 7/2007 | Zhang | |
| 2008/0117313 A1* | 5/2008 | Voorhees | H04N 5/77 348/231.99 |
| 2009/0244278 A1* | 10/2009 | Taneja | H04L 12/1831 348/143 |
| 2009/0309956 A1 | 12/2009 | Hawkins | |
| 2010/0245563 A1* | 9/2010 | Golovchinsky | H04N 7/18 348/135 |
| 2012/0062594 A1 | 3/2012 | Campbell | |
| 2012/0229590 A1 | 9/2012 | Barrus | |
| 2015/0009278 A1 | 1/2015 | Modai | |
| 2015/0220800 A1* | 8/2015 | Mahli | G06K 9/00912 382/112 |
| 2016/0049082 A1 | 2/2016 | Leatherman, III | |
| 2017/0048488 A1* | 2/2017 | Novak | G06F 3/017 |
| 2017/0111595 A1* | 4/2017 | Soni | G09G 5/14 |
| 2018/0047141 A1 | 2/2018 | El Mezeni | |
| 2018/0139374 A1 | 5/2018 | Yu | |
| 2018/0232192 A1 | 8/2018 | Timoner | |

FOREIGN PATENT DOCUMENTS

| | | |
|---|---|---|
| EP | 1460851 | 9/2004 |
| GB | 2536408 | 9/2016 |
| KR | 20080045370 A | 5/2008 |

* cited by examiner

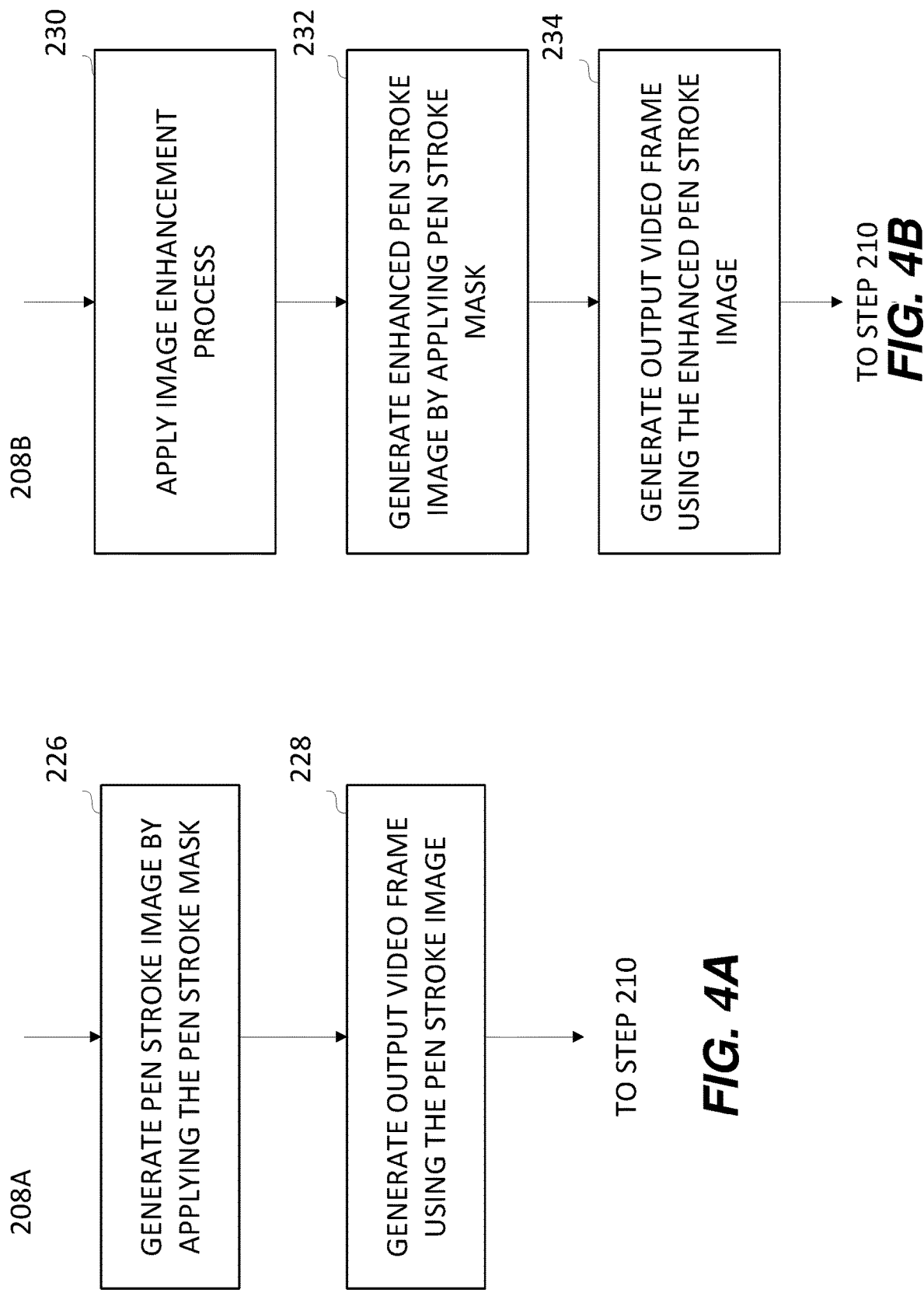

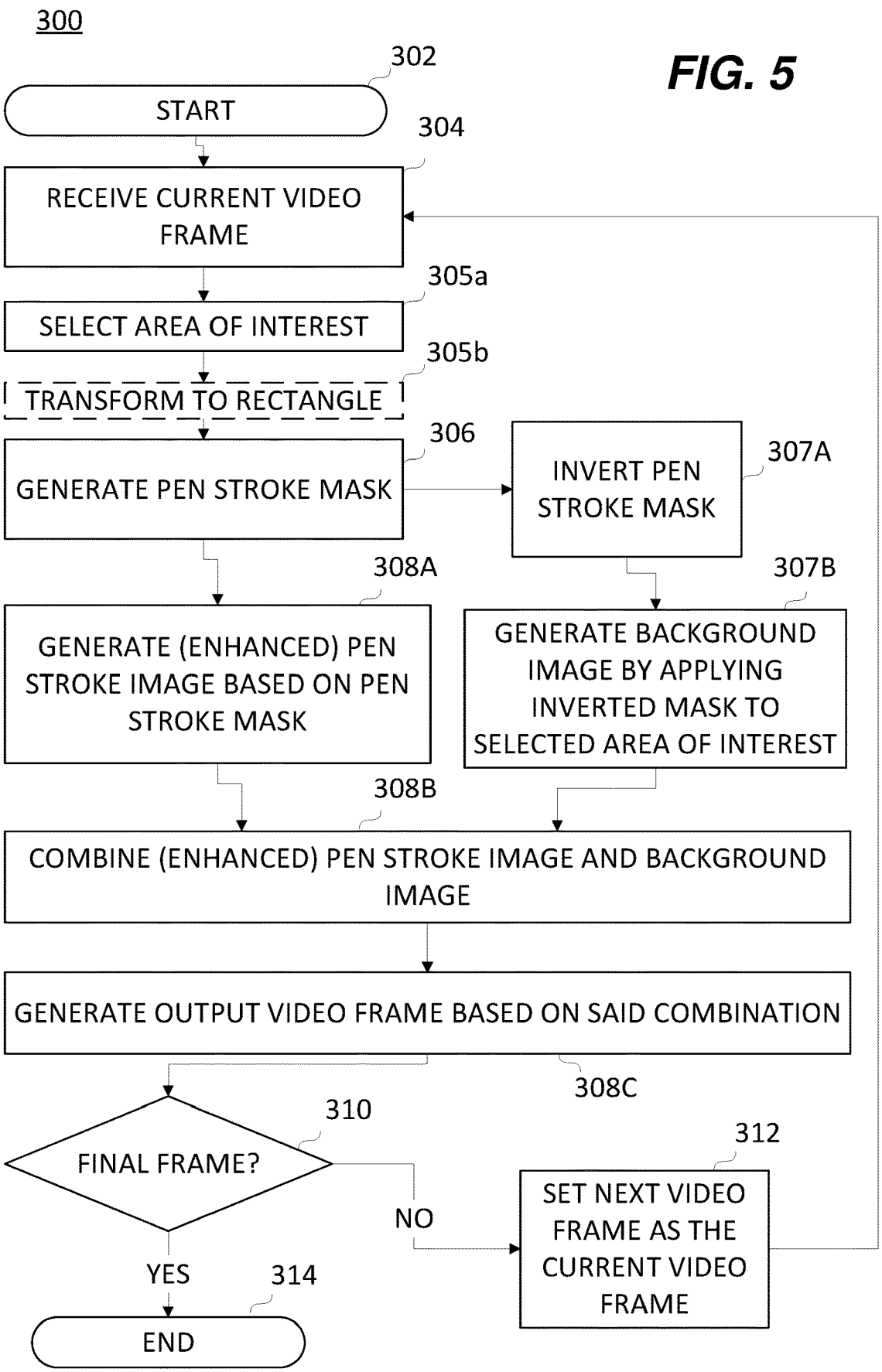

PROCESSING VIDEO INCLUDING A PHYSICAL WRITING SURFACE

CROSS-REFERENCE TO RELATED APPLICATION

This application is a divisional of U.S. patent application Ser. No. 16/642,744 filed Feb. 27, 2020, which is a National Phase entry of PCT Patent Application No. PCT/US2018/053097, having international filing date of Sep. 27, 2018, which claims priority to U.S. provisional application 62/563,719, filed Sep. 27, 2017 and EP application 17193442.5, filed Sep. 27, 2017.

TECHNICAL FIELD

The present disclosure generally relates to videoconferencing. More particularly, embodiments of the present disclosure relate to sharing the content written on a physical writing surface, such as a whiteboard, a blackboard or a flip chart, during a videoconference.

BACKGROUND

Videoconferencing is a telecommunication technology allowing people at different locations to meet virtually, by communicating audio and video data that allows the participants of the videoconference to see and hear each other. A typical videoconference comprises a number of endpoints communicating with each other via a data communication network. Each endpoint is connected to one or more cameras for capturing video of the participants at that endpoint. Each endpoint transmits its video to the other endpoints. The endpoints are also connected to a display for displaying video received from other endpoints. Each endpoint is also connected to at least one microphone to capture audio, which is transmitted to the other endpoints, and to at least one speaker to play back audio received from other endpoints.

SUMMARY

Embodiments of the present disclosure relate to a videoconferencing method for sharing content written on a physical writing surface.

An embodiment of a method of processing of a sequence of video frames from a camera capturing a writing surface comprises: receiving the sequence of video frames from the camera; selecting an image area of interest in the video frames; and for each current video frame of the sequence of video frames: generating a pen stroke mask by applying adaptive thresholding to the image area of interest; and generating an output video frame using the pen stroke mask. Selecting an image area of interest in the video frames may comprise selecting one of a sub-area of the video frames and an entire area of the video frames.

An embodiment of a control system for a videoconferencing system is configured to perform, during a setup phase, the following steps: capturing at least one image using a camera; rendering the at least one image on a display; obtaining via a phone a user selection of a region of the at least one image, the region comprising an image of a physical writing surface within the field of view of the camera; and saving a physical writing surface location to memory, the saved physical writing surface location corresponding to the region.

BRIEF DESCRIPTION OF THE DRAWINGS

Embodiments of the present invention are illustrated by way of example, and not by way of limitation, in the accompanying drawings, wherein like reference numerals refer to similar elements, and in which:

FIGS. 4A, 4B and 4C each show a flow diagram of an example of generating an output video frame using the pen stroke mask;

FIG. 5 shows a flow diagram of a second example of a method for enhancing the legibility of pen strokes in a video of a physical writing surface;

Throughout the drawings, like reference numerals refer to like parts, unless the context requires otherwise.

DETAILED DESCRIPTION

Numerous specific details are described below to provide a thorough understanding of the present invention. However, the present invention may be practiced without these specific details. In addition, well-known parts may be described in less exhaustive detail. The figures are schematic and comprise parts relevant for understanding the present disclosure, whereas other parts may be omitted or merely suggested.

Whiteboards and other types of physical writing surfaces are commonly used tools in meetings for presenting information. Although these conventional writing surfaces are well suited for meetings with all participants in the same room, they are less practical for use during a videoconference. A user can pan the camera of the videoconferencing system to the writing surface, to share the content written thereon, but this also means that the camera is no longer capturing a video of the participants in that room. Furthermore, the content written on the whiteboard may be hard to read when captured this way.

As a replacement of these conventional writing surfaces, specialized hardware can be used that allows participants to write and draw on an electronic surface, such as a touch-sensitive display. This type of device is sometimes referred to as "digital blackboard" or "virtual whiteboard". The input written on the electronic surface is transmitted to the other endpoints of the videoconference as a digital signal. A drawback of these devices is that they are relatively expensive, both in terms of purchasing and in terms of maintenance. Moreover, these devices are less intuitive to operate than conventional low tech writing surfaces.

Embodiments of the present disclosure provide an improved videoconferencing system capable of sharing content written on a physical writing surface.

Figure 1A:
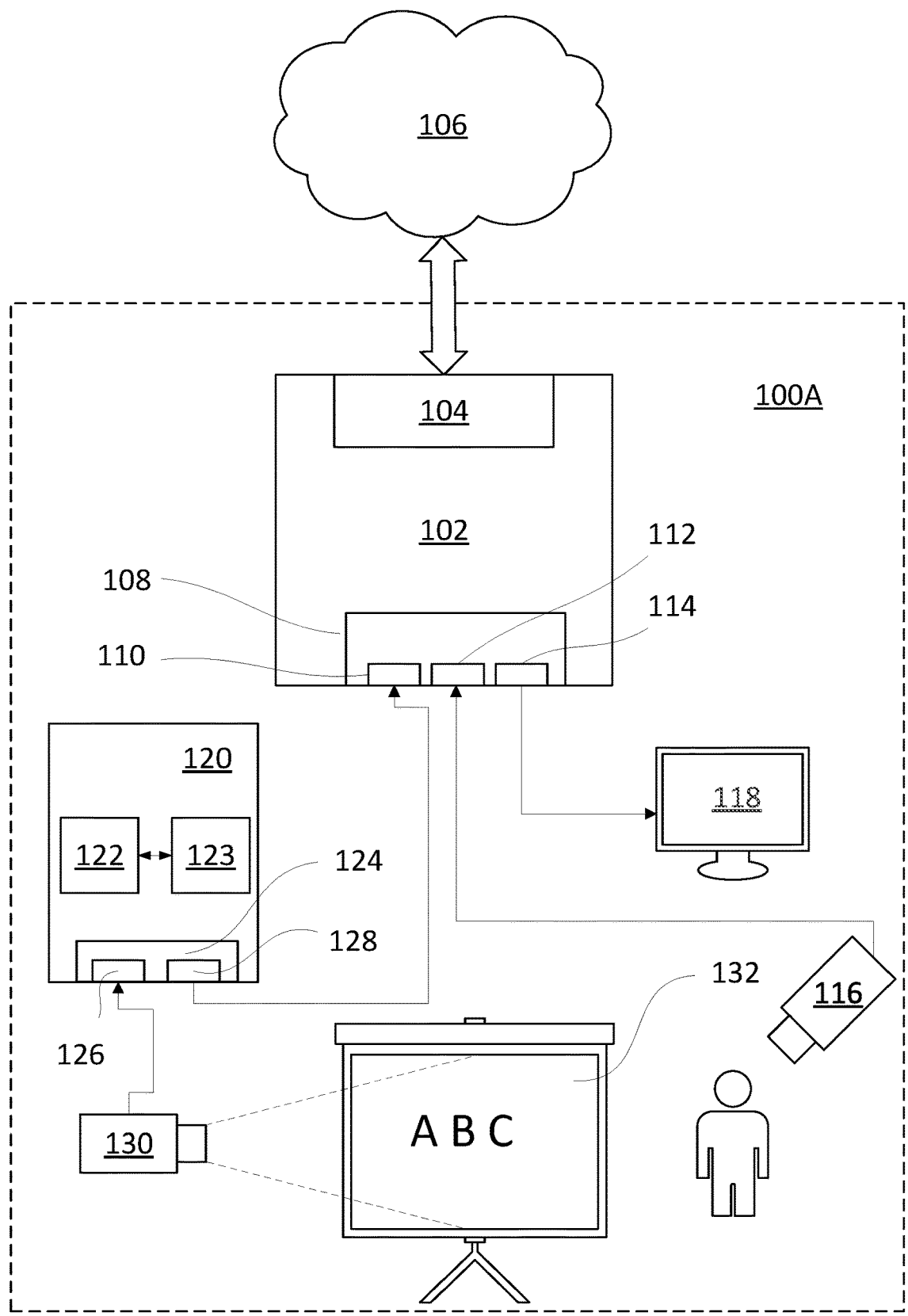
FIG. 1A shows a schematic diagram of a first example of a videoconferencing system.

In FIG. 1A, an exemplary videoconferencing system 100A is shown. The system comprises a videoconferencing endpoint 102. For example, endpoint 102 may comprise a videoconferencing client. The endpoint 102 has a network interface 104 for communicating to other videoconferencing endpoints, e.g. for direct communication with other videoconferencing clients or to a videoconferencing server that manages communication between two or more videoconferencing clients connected thereto. The network interface 104 communicates via a data communication network 106. The data communication network 106 is for example a packet network, such as an IP network. For example, the data communication network is a Local Area Network (LAN) or Wide Area Network (WAN). In the example shown, network 106 is the Internet.

The endpoint 102 further comprises a video input/output (I/O) component 108, that comprises multiple video interfaces for input and output of video signals. The I/O component 108 has a display input connector 110 for connecting a computer for receiving an input video signal. In the example shown, the input connector 110 is an HDMI input connector.

I/O component 108 further comprises an input connector 112 for receiving camera signals, and a display output connector 114. The input connector 112 is connected to a camera 116 of the videoconferencing system 100A, to capture a video of participants of the videoconference. In the example shown, the camera 116 is connected to input connector 112 via a cable. In an alternative example, the camera is connected to input connector 112 via a wireless connection. The video captured by camera 116 is transmitted to the endpoint 102, which transmits the video via network 106 to other endpoints of the videoconference using network interface 104.

The output connector 114 of the I/O component 108 is connected to a display 118 of the videoconferencing system. In the example shown, the output connector 114 is an HDMI output connector, connected to an HDMI input of the display 118 using an HDMI cable. The endpoint 102 is configured to receive one or more videos transmitted by other participants over the network 106 using the network interface 104, and to output a corresponding video signal to display 118.

The system 100 further comprises a computing apparatus 120. The computing apparatus 120 comprises a display controller 122 for generating an output video signal for output on a display, and a processor 123. In the example shown, the display controller 122 and the processor 123 of the computing apparatus are embodied as two or more separate components, which are connected to each other for exchanging data. For example, the display controller 122 may be implemented as part of a graphics processing unit (GPU), whereas the processor 123 comprises a central processing unit (CPU). Alternatively, the display controller 122 and the processor 123 may be embodied as a single processing component that is configured to perform the functionality of both the display controller 122 and the processor 123.

The computing apparatus 120 also comprises an I/O component 124, that has an input connector 126 for receiving camera signals, and a display output connector 128 for output of video signals generated by the display controller 122. The input connector 126 is connected to a camera 130 that is configured to capture video of a physical writing surface 132. In the example shown, the physical writing surface 132 is a whiteboard, however the system 100 can also be used to capture video of other writing surfaces, such as a flip chart or a black board. In the example shown, the camera 130 is connected to the input connector 126 using a cable. For example, the input connector 126 is a USB connector, for connecting camera 130 via a USB cable. Alternatively, the camera 130 may connect to computing apparatus 120 via a wireless connection.

The I/O component 124 is connected to the display controller 122 and the processor 123 for communication of video data received via input connector 126 to the processor 123 and for output of an output video signal generated by the display controller 122 via output connector 128. The processor 122 receives a sequence of video frames of the whiteboard 132 as captured by camera 130. The processor is configured to generate processed video data by applying a video enhancement process to the sequence of video frames. The video enhancement process enhances the legibility of pen strokes, e.g. text and drawings, on the physical writing surface.

The output connector 128 of the computing apparatus 120 is connected to the video input connector 110 of the videoconferencing endpoint 102. In the example shown, the input connector 110 and the output connector 128 are both HDMI connectors, and the connectors 110, 128 are connected via an HDMI cable. The computing apparatus 120 is configured to output an enhanced video signal corresponding to the processed video data as generated by the processor 123. The enhanced video signal is output from the computing apparatus to the videoconferencing endpoint 102 via the cable connecting connectors 110 and 128.

In the example of FIG. 1A, an HDMI video interface is used for connectors 110, 114 and 128. However, the present disclosure is not limited to an HDMI video interface, and other types of video interfaces can be used additionally or alternatively, such as S-video, DVI, composite video, component video, DisplayPort, FireWire, VGA or SCART.

The display input connector 110 of the videoconferencing endpoint 102 is intended for connecting a computer, to share a screen of the computer. For example, in a typical videoconferencing scenario, the display input connector 110 is connected to a computer running presentation software, such as Microsoft PowerPoint, to share the slides of the presentation with the other participants of the videoconference. In this scenario, the videoconferencing enables other participants to view the slides together with the image of the person presenting as captured by camera 116. However, in embodiments of the invention, the display input connector 110 is used in a manner different from its intended use, by connecting a computing apparatus 120 and thereby providing to the endpoint 102 a video signal corresponding to a processed version of the video captured by an additional camera 130. Therefore, a participant in a first room can use a conventional whiteboard 132, while the content he writes on the whiteboard is shared in a clearly readable way with the other participants. Moreover, the other participants can still watch the first room, as the video camera 116 of the endpoint 102 is still available to share video of the first room.

The camera 130 can optionally be a relatively low-quality camera, as compared to the camera 116 for capturing the participants, as the images of the content written on the whiteboard 132 are processed to increase legibility before transmission to other participants. For example, the resolution of the camera 130 can be lower than the resolution of camera 116.

In an example, the computing apparatus 120 is a portable device. For example, the apparatus 120 can be a laptop, a tablet or a smartphone. The camera 130 may also be a portable device. In an example, the camera 130 is an integrated part of the computing apparatus 120, e.g. an integrated webcam of a laptop. In another example, the camera 130 and the computing apparatus 120 are separate components, e.g. the computing apparatus is a laptop that is connected to a USB webcam.

By providing the computing apparatus and the camera connected thereto as a portable system, they can be shared across multiple videoconferencing rooms. In contrast, conventional devices for sharing written content, such as digital blackboards and virtual whiteboards, are typically large and heavy wall-mounted devices, such that moving this type of equipment between multiple rooms is not practical.

In an example, the computing apparatus 120 is a screenless device. In other words, the computing apparatus has no display. This has the advantage that the apparatus can have a small form factor. Examples of screen-less computing devices having a small form factor include Intel Compute Stick, InFocus Kangaroo and Raspberry Pi. The computing apparatus 120 may for example be a single board computer.

In an example, the computing apparatus 120 is a dongle. A dongle is a device having a small form factor, and at least one connector for connecting the dongle to another device. In the present example, the dongle comprises the video interface output connector 128. The video interface output connector 128 is connectable to the input connector 110 of the videoconferencing endpoint 102. The dongle may for example be powered by connecting to mains power via a power adapter or by power over USB, wherein the dongle may be connected to an USB port of the videoconferencing endpoint 102 if available.

Figure 1B:
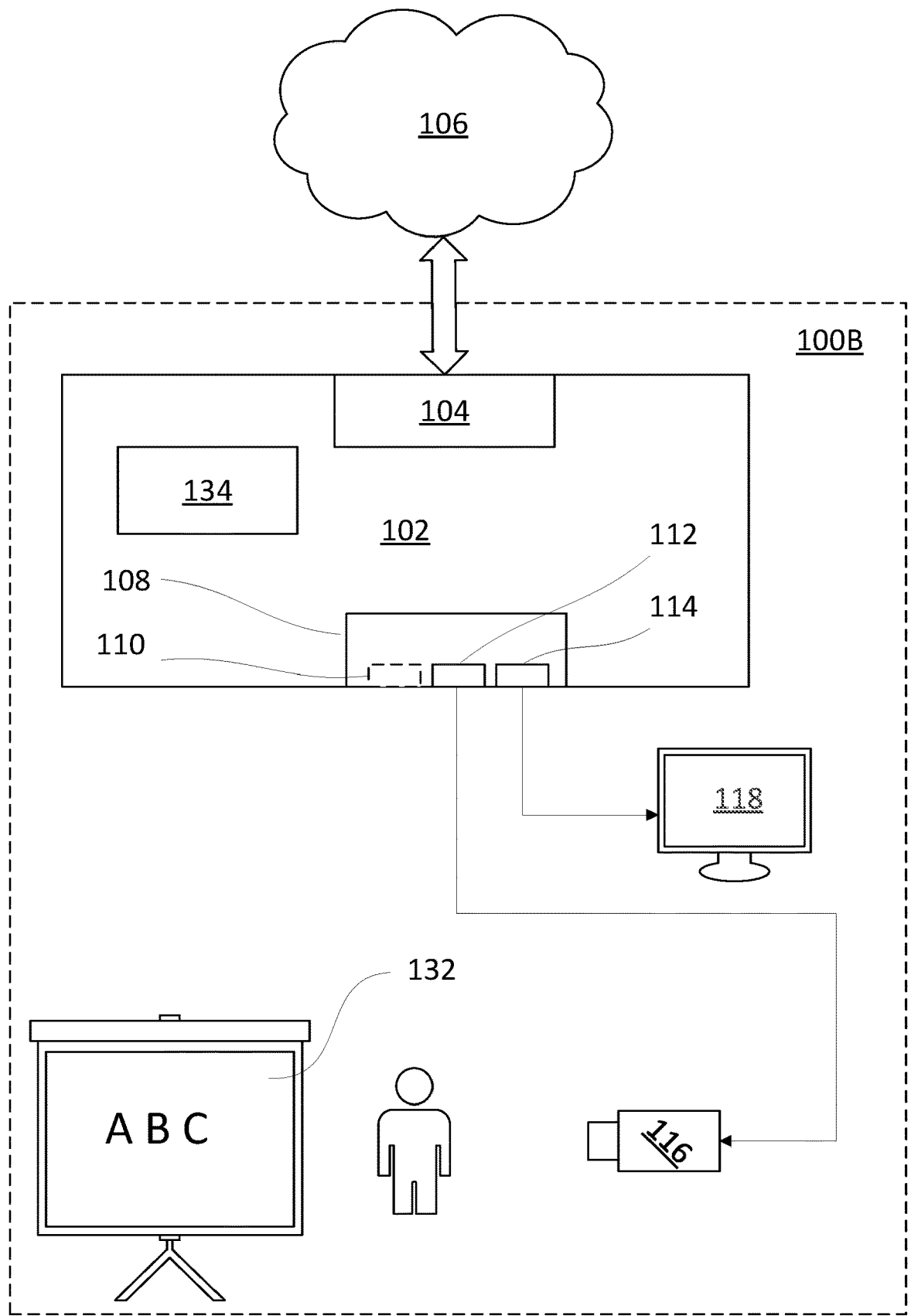
FIG. 1B shows a schematic diagram of a second example of a videoconferencing system.

FIG. 1B shows an example of a videoconferencing system 100B, wherein the video processing is integrated in the endpoint 102, rather than as a separate computing apparatus 120 as in FIG. 1A. The camera 116 captures a video of both the whiteboard 132 and the participants in the room. As in FIG. 1A, the video captured by camera 116 is communicated to endpoint 102 via input connector 112 of I/O component 108. In FIG. 1B, camera 116 is connected to endpoint 112 via a cable. Alternatively, the camera 116 may be connected to endpoint 112 via a wireless connection.

In the embodiment of FIG. 1B, the endpoint comprises a processor 134. The processor 134 may be dedicated to processing the video captured by the camera 116, which transmits the processed video to one or more other processing components of the endpoint 102 that implement the videoconferencing functionality. Alternatively, the endpoint 102 comprises a processor that implements both video processing and videoconferencing capabilities. The processor 134 may for example comprise a central processing unit (CPU) and/or a graphics processing unit (GPU).

The display input connector 110 is optional in this embodiment, and may be used e.g. for connecting a computer for screen sharing.

The processor 134 receives a sequence of video frames of the whiteboard 132 and the participants in the room, as captured by camera 116. The processor 134 is configured to generate processed video data by applying a video enhancement process to the sequence of video frames. The video enhancement process enhances the legibility of pen strokes, e.g. text and drawings, on the physical writing surface. Optionally, the processor 134 is configured to apply the video enhancement process only to the image area of the received video frames that corresponds to the whiteboard, and not to the other image areas, e.g. that capture the participants in the room. The video enhancement process applied to the image area corresponding to the whiteboard 132 enhances the legibility of pen strokes, e.g. text and drawings, on the physical writing surface.

In another example, multiple cameras are provided, a dedicated camera for capturing the whiteboard 132, and a dedicated camera for capturing the participants. In this example, the video enhancement process is applied to the video captured by the dedicated whiteboard camera.

The processed video of the whiteboard and the video of the participants may be communicated by endpoint 102 to a videoconferencing servers and/or other videoconferencing endpoints as two separate video streams, or as a single video stream including combined video frame that have one image area corresponding to the enhanced video of the whiteboard and another image area to the video of the participants.

Figure 2A:
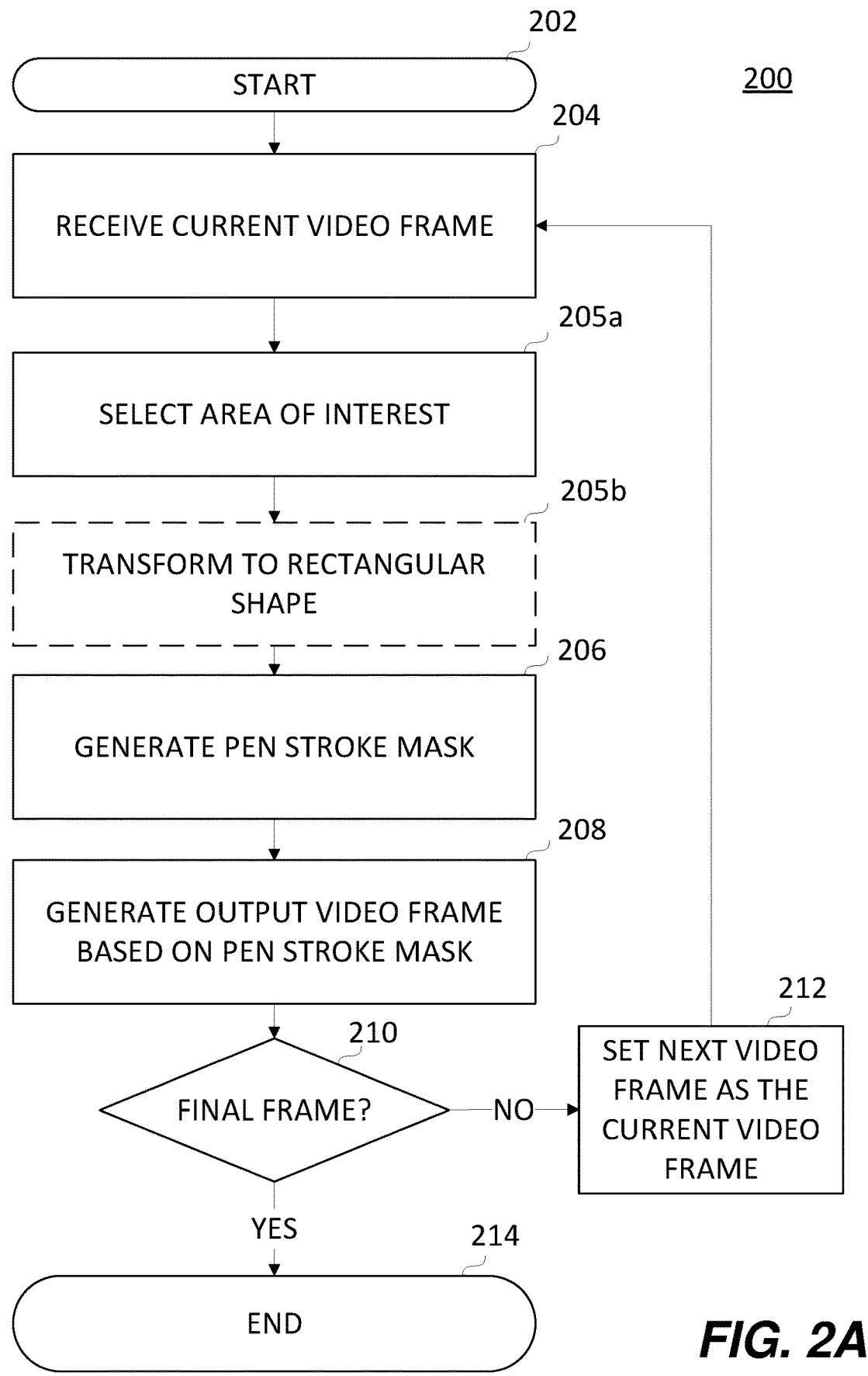
FIG. 2A shows a flow diagram of a first example of a method for enhancing the legibility of pen strokes in a video of a physical writing surface.

FIG. 2A shows an example of a video enhancement process 200 executed by the computing apparatus 120 or processor 134 for enhancing legibility of pen strokes in the sequence of video frames captured by camera 130 or camera 116, respectively. The computing apparatus 120 or processor 134 processes the sequence of video frames frame by frame. The process starts at 202. The current video frame is received in step 204. In step 205a, an image area of interest is selected. The image area of interest may comprise substantially the entire image area of the video frame. For example, when a dedicated camera 130 captures images of the whiteboard, the whiteboard may span the entire image area of the video frame or at least substantially the entire image area of the video frame. In another example, the image area of interest is a sub-area of the video frame. For example, when a camera 116 captures both the participants in a room and the whiteboard, the image area of interest may correspond to a sub-area of the video frames that contains the whiteboard.

For example, the image area of interest may be set by a user via a user interface. A user specifies the area in the video that corresponds to the whiteboard. In another example, the area of the video that corresponds to the whiteboard is automatically determined, e.g. using an object recognition algorithm. Selecting the area of interest may include manipulation of a camera, such as camera 116. For example, the manipulation may include panning a camera so that the whiteboard is brought into its field of view, or is moved within its field of view, e.g. such that the whiteboard is substantially centered within the camera's field of view. Additionally or alternatively, the manipulation may include zooming a camera so that the whiteboard occupies more of its field of view. Additionally or alternatively, the manipulation may include physically relocating a camera so that the whiteboard occupies more of its field of view and/or is substantially centered, or at least more centered, within its field of view.

In an embodiment, the selected image area of interest is the same for all subsequent frames. Once the user has specified the image area of interest or the system has automatically determined the image area of interest, the same image area of interest is used for all subsequent frames. For example, the boundary of the selected image area of interest is determined based on the user input or the automatic determination. For example, the pixel location of two or more corners, or even all four corners, of the whiteboard are stored and used in subsequent frames to identify the image area of interest to be subjected to the enhancement process for increasing legibility of the writings on the whiteboard.

In step 206, a pen stroke mask is generated. In step 208 an output video frame is generated based on the pen stroke mask. It is determined whether the current frame is the final frame of the sequence of video frames in step 210. If the sequence comprises further video frames, step 212 is executed, wherein the next video is set as the current video frame. In other words, the next iteration of steps 204-210 will be performed using the next video frame instead of the current video frame. If a final frame is detected in step 210, the process ends at step 214.

Further, the method may include an optional step 205b (FIG. 2A) of transforming the selected image area, e.g. a sub area corresponding to the whiteboard, to a substantially rectangular shape. In the image captured by the camera, the whiteboard may appear skewed due to the perspective. In step 205b a geometric transform is applied such that the whiteboard has a rectangular shape in the resulting image. In general, the geometric transform will be a projective transform. Typically, the geometric transform will be a perspective transform. As an example, an affine transform may be applied to the selected image area.

An advantage of embodiments of the present disclosure is that enhancing the legibility of the pen strokes in the video frames reduces the entropy of the sequence of video frames. Therefore, when the videoconferencing endpoint 102 encodes the video for transmission to a server or other endpoints, the compression efficiency of the encoding is increased, in particular when the encoding comprises inter-frame compression.

Figure 2B:
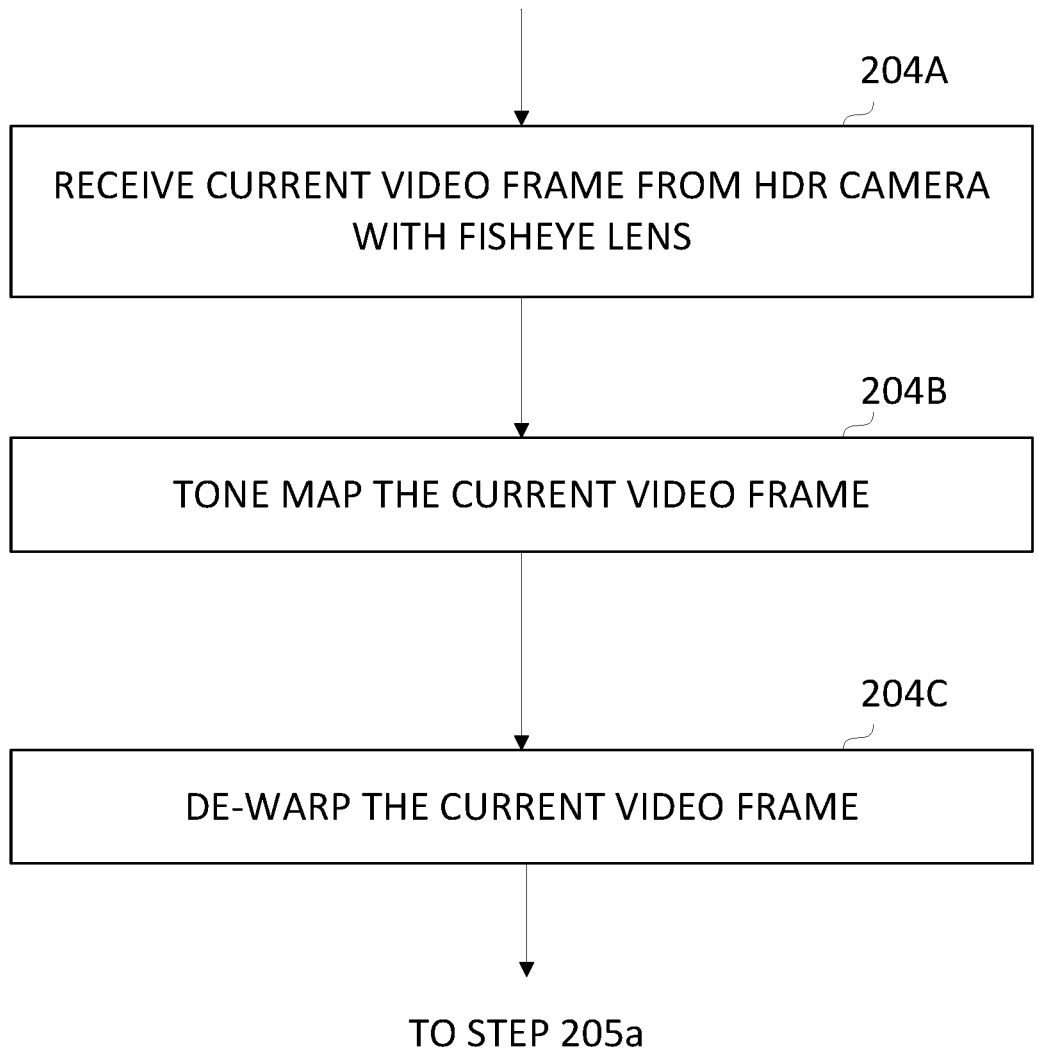
FIG. 2B shows optional processing steps for the method of FIG. 2A.

FIG. 2B show optional sub-steps of step 204, i.e. the step of receiving the current video frame. In the embodiment of FIG. 2B, the camera is a high dynamic range (HDR) camera. In addition, the camera of the example of FIG. 2B is equipped with a fisheye lens or a different type of wide angle lens. Step 204A comprises receiving the current video frame from the HDR camera equipped with the wide-angle lens. Tone mapping is applied to the HDR image in step 204B. The tone mapping may be performed by the computing apparatus 120 or processor 134 to obtain a tone mapped image. In another example, the tone mapping is performed by the camera, i.e. the tone mapping operation is an integral part of the internal video processing applied by the camera, to directly provide a tone mapped video to the computing apparatus 120 or the processor 134, respectively. In this case the computing apparatus 120 or the processor 134, respectively, omit step 204B.

An advantage of HDR video capture is that saturation of the image due to reflections on the whiteboard is avoided. Such reflections may e.g. be caused by overhead lighting. Therefore, loss of information written on the whiteboard may be prevented or reduced.

In step 204C the current video frame is de-warped. Using a wide angle lens, e.g. a fish eye lens, has the advantage of being able to capture the videoconferencing room over a large angle, e.g. capturing both participants in the room and a whiteboard located in the room. However, some lenses may warp the image, such that straight lines no longer appear straight in the captured image. To undo this warping effect of some lens types, a de-warping operation can be applied in step 204C. After de-warping, straight lines such as edges of a whiteboard, also appear as straight lines in the captured video frames. For example, the de-warping operation may be applied by the computing apparatus 120 or the processor 134, respectively. As another example, de-warping may be incorporated in internal video processing of the camera, in which case the computing apparatus 120 or the processor 134 omits step 204C.

Optionally, the order of step 204B and 204C may be reversed, with step 204C being performed prior to step 204B.

In an embodiment, tone mapping and/or de-warping is applied to the full video frame, as also image areas that do not correspond to the whiteboard may benefit from these operations.

Figures 3A, 3B:
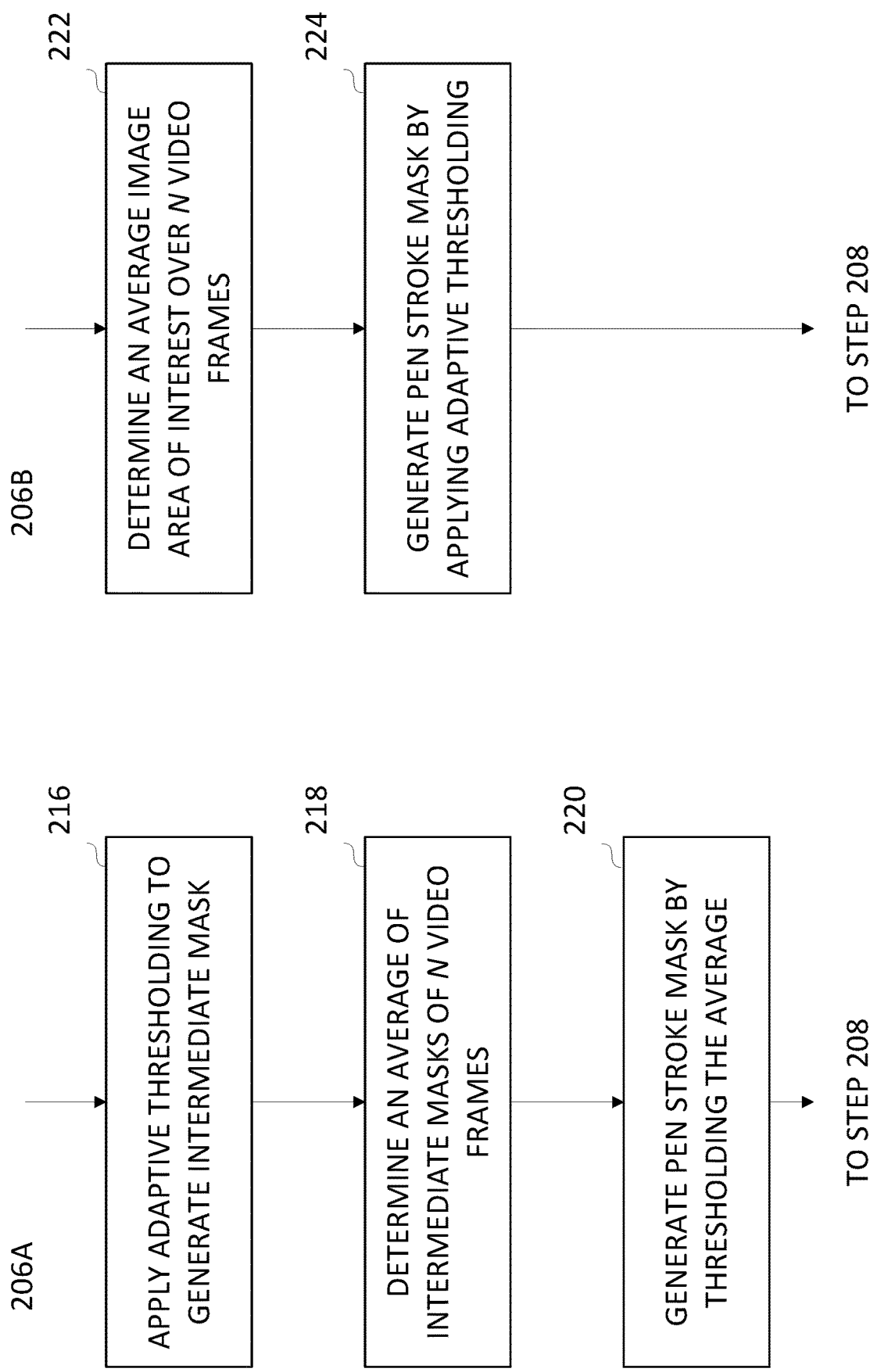
FIGS. 3A and 3B each show a flow diagram of an example of generating a pen stroke mask using adaptive thresholding.

FIGS. 3A and 3B show two examples of step 206, i.e. the step of generating a pen stroke mask. Both examples apply adaptive thresholding, wherein a foreground (e.g. pen strokes on a whiteboard) is separated from background (e.g. unwritten area of the whiteboard) by applying a threshold that varies for different parts of the image. The threshold to apply to a part of the image is selected based on local image characteristics.

One type of adaptive thresholding uses a local threshold that is set depending on the pixel values, i.e. pixel intensities or brightness, in a neighborhood of each pixel. For example, the local threshold can be based on at least one of a mean value, a weighted mean value—such as a Gaussian weighted mean and a median value of the pixels in said neighborhood. Additionally or alternatively, the threshold can be based on the mean of the maximum pixel value and the minimum value of the pixels in said neighborhood.

The result of adaptive thresholding may take the form of a binary image, each pixel of the binary image having one of a minimum value $V_{MIN}$ and a maximum value $V_{MAX}$ to indicate whether said pixel is classified as foreground or background. For example, the pixels of the pen stroke mask may have a value of either $V_{MIN}=0$ or $V_{MAX}=1$. In a different example, each pixel of the binary image is stored using M bits, and may take up a value of either $V_{MIN}=0$ or $V_{MAX}=2^M-1$.

In the example of FIG. 3A, adaptive thresholding is applied directly to the selected image area of interest of the current video frame, to generate an intermediate mask. In step 218, an average is calculated of the intermediate masks of the N last video frames. In other words, an average is calculated of the intermediate mask of the current video frame and the intermediate masks of the N−1 previous video frames. For example, N is in the range of 4-32 frames, e.g. 10, 15 or 20. In an example, the intermediate mask calculated in step 218 is stored in a FIFO data structure, such as a queue. The average of the intermediate masks is then calculated by averaging all intermediate masks in the queue.

As the intermediate masks are binary images, averaging of the intermediate masks will result in a mask that has pixel values between $V_{MIN}$ and $V_{MAX}$. To obtain a binary pen stroke mask, a fixed threshold is applied to the averaged intermediate mask. The threshold is for example set to floor[$(V_{MIN}+V_{MAX})/2$], wherein floor(X) rounds X to the nearest integer less than or equal to X.

In the example of FIG. 3B adaptive thresholding is applied to an average of the selected image area of interest of the N last video frames. In step 222 the average over the N last video frames is calculated. In other words, an average is calculated of the image area of interest of the current video frame and the image area of interest of the N−1 previous video frames. For example, N is in the range of 4-32 frames, e.g. 10, 15 or 20. In an example, in each iteration the image area of interest of the current video frame is stored in a FIFO data structure, such as a queue. An averaged image is then calculated by averaging all images in the queue.

In step 224, adaptive thresholding is applied to the averaged image calculated in step 222. The result is a binary image that is used as the pen stroke mask.

The examples of FIGS. 3A and 3B refer to an averaging operation for generating the pen stroke mask. However, the present disclosure is not limited to an averaging operation. In general, any temporal smoothing filter can be applied to the intermediate masks or video frames respectively, instead of averaging. Examples of smoothing filters that can be used instead of the exemplary averaging filter include: a weighted moving average filter, a multi-pass moving average filter, an exponential smoothing filter, a Gaussian filter or a low pass filter.

In a first example, the temporal smoothing filter is applied to the current mask or video frame and at least one previous mask or video frame, respectively. In a second example, the temporal smoothing filter is applied to at least two previous masks/video frames.

Optionally, the method may include switching between two or more smoothing modes. In an example, a first smoothing mode includes an "off" mode, wherein no smoothing is applied, i.e. omitting the steps 218 and 220 or step 222. The pen stroke mask is thus generated by applying adaptive thresholding on the image area of interest of the current video frame. In another example, a second smoothing mode includes an "on" mode, wherein smoothing is applied e.g. as described above. Optionally, the amount of smoothing applied in "on" mode can be controlled. For example, the number of previous video frames to use for smoothing is adjustable, wherein increasing the number of previous video frames to be used for smoothing increases the amount of smoothing and reducing the number of previous video frames to be used for smoothing decreases the amount of smoothing. Switching of the smoothing mode and controlling the amount of smoothing can be either user controlled or automatic.

The adaptive thresholding operation described in FIGS. 3A and 3B may require an intensity image as input. The video frames received from camera 130 typically comprise color images. In case the video frames are color images, a pre-processing step may be performed prior to step 206 for converting the color image into an intensity image. The steps described in FIGS. 3A and 3B are then applied to the resulting intensity image. For example, if the input image is an RGB image or a BGR image the conversion to an intensity image Y may comprise calculating $Y=\alpha R+\beta G+\gamma B$, wherein $\alpha$, $\beta$ and $\gamma$ are weighting factors, e.g. $\alpha=0.299$, $\beta=0.587$ and $\gamma=0.114$.

The inventor realized that the process of separating pen strokes from background can benefit from the fact that the content of the whiteboard does not change rapidly over time. In fact, once pen strokes have been made on a portion of the whiteboard, these portions usually remain unchanged until the whiteboard is erased/the flip chart is flipped. The combination of temporal smoothing and adaptive thresholding exploits this property of whiteboard contents, and results in a good separation of pen strokes from background, even under difficult light conditions (such as low light conditions or when light intensity varies over the area of the whiteboard) and/or when using a low-quality camera.

Figure 4C:
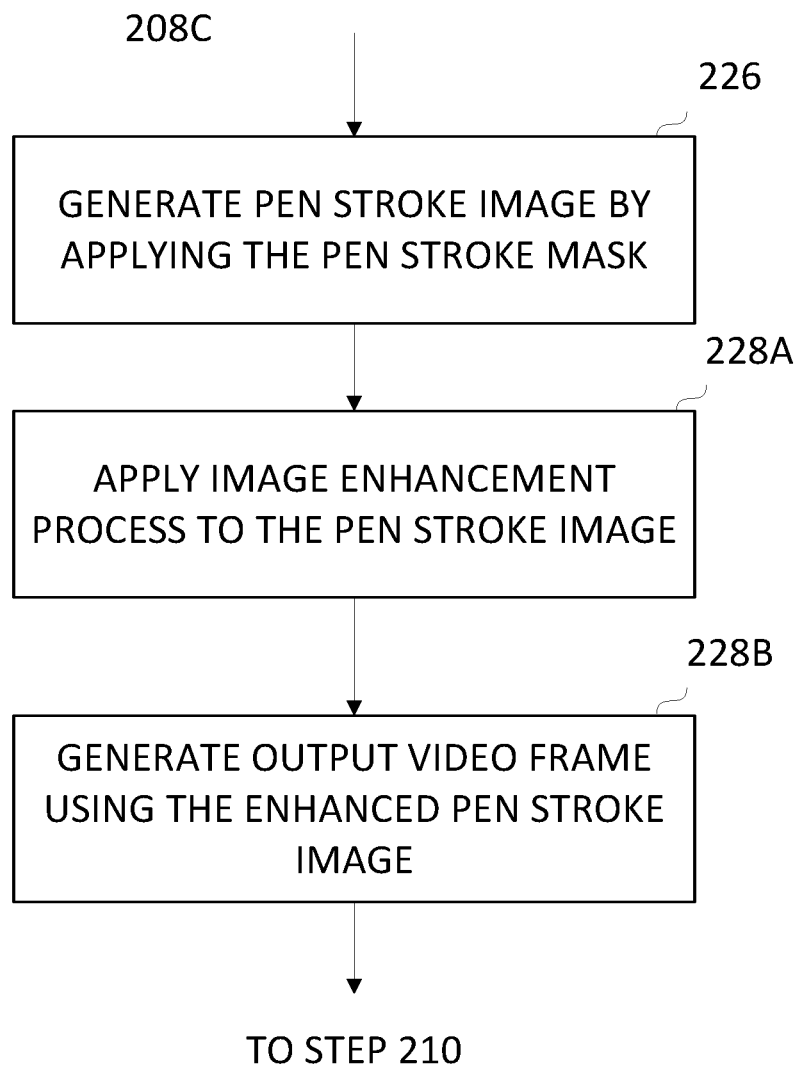

FIGS. 4A, 4B and 4C show examples of generating an output video frame using the pen stroke mask. In step 226 of the example of FIG. 4A, the pen stroke mask is applied to the image area of interest of the current video frame, thereby extracting the pen strokes from the current video. In step 228, the output video frame is generated using the pen stroke image.

In the example of FIG. 4B, an image enhancement process is applied to the image area of interest of the current video frame prior to applying the pen stroke mask. Although in some embodiments the pen stroke mask may be generated by converting the original input image to an intensity image, the image enhancement process is applied to the original input image. In step 230 the image enhancement process is applied to the image area of interest of the original input image resulting in an enhanced image. In step 232 an enhanced pen stroke image is generated by applying the pen stroke mask to the enhanced image. In step 234 the output video frame is generated using the enhanced pen stroke image.

In the example of FIG. 4C, the order of applying the pen stroke mask and the image enhancement process is reversed compared to the example of FIG. 4B. In step 226 a pen stroke image is generated by applying the pen stroke mask to the current video frame. In step 228A the image enhancement process is applied to the resulting pen stroke image. In step 228B the output video frame is generated using the enhanced pen stroke image.

The image enhancement process described with reference to FIGS. 4B and 4C may for example comprise a color adjusting process. In an example, the color adjustment process comprises a saturation adjusting process to change, e.g. increase, the color saturation. Alternatively or additionally, the color adjustment process comprises histogram equalization of one or more color component. For example, the color adjustment process comprises histogram equalization of: A) the hue and/or saturation and/or value component of a Hue, Saturation, Value (HSV) representation of the current video frame/pen stroke image; or B) the hue and/or saturation and/or lightness component of a Hue, Saturation, Lightness (HSL) representation of the current video frame/pen stroke image. In a further example, the histogram of the saturation component of an HSV or HSL representation is equalized, while the other two components are unaltered. In another example, histogram equalization is applied in a LAB color space.

The output video frame is generated based on the pen stroke image (FIG. 4A) or the enhanced pen stroke image (FIGS. 4B and 4C). In a first example, the output video frame is generated by combining the (enhanced) pen stroke image with a solid background, e.g. providing the (enhanced) pen stroke image on a white background. FIG. 5 illustrates a second example, wherein the output video frame is generated by combining the (enhanced) pen stroke image with a background obtained from the original input image.

In the method 300 of FIG. 5, steps 302, 304, 305*a*, 305*b*, 306, 310, 312, 314 correspond to steps 202, 204, 205*a*, 205*b*, 206, 210, 212, 214 of the example of FIG. 2 respectively. The method 300 further includes the step 307A of inverting the pen stroke mask obtained in step 306. Further, the inverted pen stroke mask is applied to the image area of interest of the original input video frame in step 307B to obtain a background image. Step 308A summarizes the examples of 4A-4C that generate a pen stroke image or an enhanced pen stroke image, based on the pen stroke mask. In step 308B the (enhanced) pen stroke image is combined with the background image. For example, the (enhanced)

pen stroke image may be added to the background image, i.e. the result of step 308B is the sum of the (enhanced) pen stroke image of step 308A and the background image of step 307B. The output video frame is then generated based on said combined image in step 308C.

In case the selected image area of interest corresponds to a sub-area of the video frames, the output video frame may comprise either the result of step 308B—thus omitting areas outside the selected sub-area—or the combination of the result of step 308B with the areas outside the selected sub-area.

Figure 6:
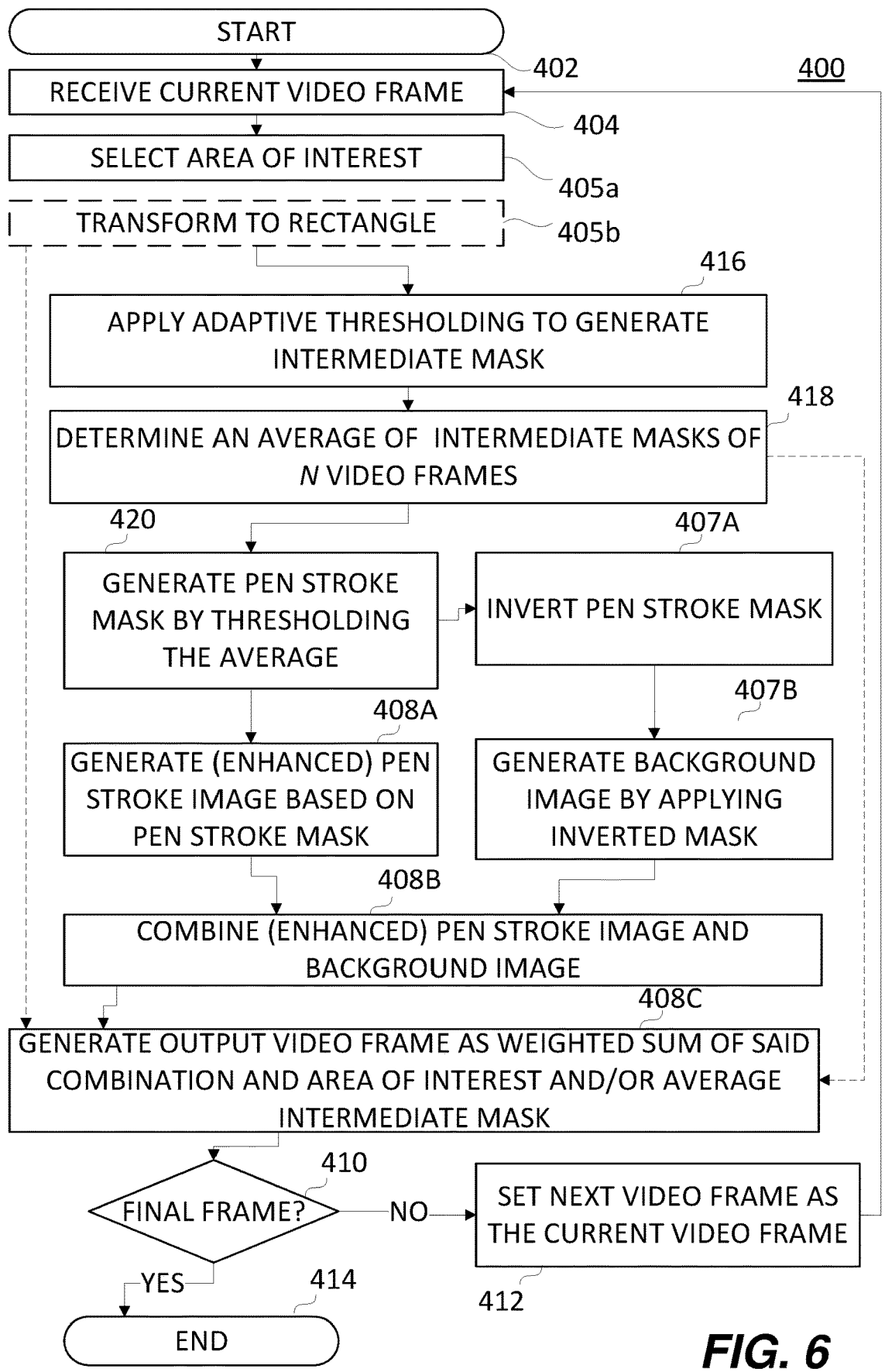
FIG. 6 shows a flow diagram of a third example of a method for enhancing the legibility of pen strokes in a video of a physical writing surface.

In some embodiments, the output video frame is equal to the combined image resulting from step 308C. In other embodiments, the output video frame may be based on the combined image, with further image processing steps. For example, the method 400 of FIG. 6 generates the output video frame as a weighted sum of the combined image and at least one of: the average intermediate mask, as obtained in step 216 of the process 206A of FIG. 3A, and the current video frame, i.e. the originally received video frame. In FIG. 6, steps 402, 404, 405$a$, 405$b$, 407A, 407B, 408A and 408B correspond to steps 302, 304, 305$a$, 305$b$, 307A, 307B, 308A and 308B of FIG. 5 respectively, while steps 416, 418 and 420 correspond to steps 216, 218 and 220 of FIG. 3A respectively. The method 400 of FIG. 6 further includes step 408C wherein the output video frame comprises the weighted sum of: A) the combined image of step 408B and B) the image area of interest of the originally received current video frame of step 404 and/or the average intermediate mask of step 418. The dashed lines connecting steps 404 and 418 to step 408C indicate that either one of, or both of, the image area of interest of the current video frame and the average intermediate mask can be used in step 408C.

For example, an output video frame F is obtained as $F=w_1A+w_2B+w_3C$, wherein A, B and C are the combined image, the average intermediate mask and the original video frame respectively, and $w_1$, $w_2$ and $w_3$ are weighting factors. In some embodiments, $w_1$, $w_2$ and $w_3$ are all non-zero. In other embodiments, $w_2$ or $w_3$ is set to zero. For example, $w_3$ is set to zero, while $w_1$ and $w_2$ may be 0.6-0.9 and 0.2-0.4 respectively, e.g. $w_1=0.75$ and $w_2=0.35$. In another example, $w_2$ is set to zero, while $w_1$ and $w_3$ may be 0.6-0.9 and 0.2-0.4 respectively, e.g. $w_1=0.75$ and $w_3=0.35$. It is noted that the weighting factors may, but are not required to, sum to 1.

The embodiments of methods for enhancing legibility of pen strokes in a video of a physical writing surface, as described in this disclosure, can be applied to the entire area of each video frame or only to a selected sub-area of the video frame. For example, a user can select the area in the video that corresponds to the whiteboard, and the method is applied to the selected area only, while the other areas of the video are not processed. For example, a selection mask is applied to select an area in each video frame, the process for enhancing the legibility of the pen strokes is applied to the selected area, and the result is combined with the area of the input video frame outside the selected area, i.e. the unselected and unprocessed area. In another example, the area of the video that corresponds to the whiteboard is automatically selected, e.g. using an object recognition algorithm.

In embodiments wherein a sub-area is selected in each video frame and also the histogram equalization as described above is performed, the histogram equalization may be performed either on the entire area of the original input image or on the selected sub-area only.

Optionally, a geometric transform is applied as a preprocessing or postprocessing step to make the writing surface appear as a rectangular shape, e.g. in step 205$b$, 305$b$ and/or 405$b$. The geometric transform may be applied to the entire area of each video frame, or only to a selected area. In particular, a selected area of interest of the video frame, corresponding to the physical writing surface, may be preprocessed using a geometric transform, and then the legibility may be increased using any of the methods described herein. The output video frame may for example be the geometric transformed and enhanced version of the selected area of the video frame. In a further example, the geometric transformed and enhanced selected area is displayed together with the original frame, e.g. superimposed on the original frame or displayed adjacent to the original frame.

The methods for enhancing legibility as described in this disclosure may optionally be executed real-time.

Embodiments described herein may be implemented in hardware, software, firmware and combinations thereof. For example, embodiments may be implemented on a system comprising electronic circuitry and components, such a computer system. Examples of computer systems include desktop computer systems, portable computer systems (e.g. laptops), handheld devices (e.g. smartphones or tablets) and networking devices. Systems for implementing the embodiments may for example comprise at least one of an integrated circuit (IC), a programmable logic device (PLD) such as a field programmable gate array (FPGA), a digital signal processor (DSP), an application specific IC (ASIC), a central processing unit (CPU), and a graphics processing unit (GPU).

Certain implementations of embodiments described herein may comprise a computer program product comprising instructions which, when executed by a data processing system, cause the data processing system to perform a method of any of the embodiments described herein. The computer program product may comprise a non-transitory medium storing said instructions, e.g. physical media such as magnetic data storage media including floppy diskettes and hard disk drives, optical data storage media including CD ROMs and DVDs, and electronic data storage media including ROMs, flash memory such as flash RAM or a USB flash drive. In another example, the computer program product comprises a data stream comprising said instructions, or a file comprising said instructions stored in a distributed computing system, e.g. in one or more data centers.

The present disclosure is not restricted to the embodiments and examples described above. Numerous modifications and variations can be made without departing from the scope of the present disclosure, defined by the accompanying claims.

In an example, a computer, such as a laptop, equipped with a webcam is configured as a videoconferencing endpoint, e.g. the computer is configured to run videoconferencing software for communicating with at least one of a remote videoconferencing client and a remote videoconferencing sever. The computer is further configured to perform any of the methods of the present disclosure for enhancing legibility of pen strokes in a video of a writing surface, and to communicate the resulting output video frame to said at least one of a remote videoconferencing client and a remote videoconferencing server using the videoconferencing software.

Figure 7:
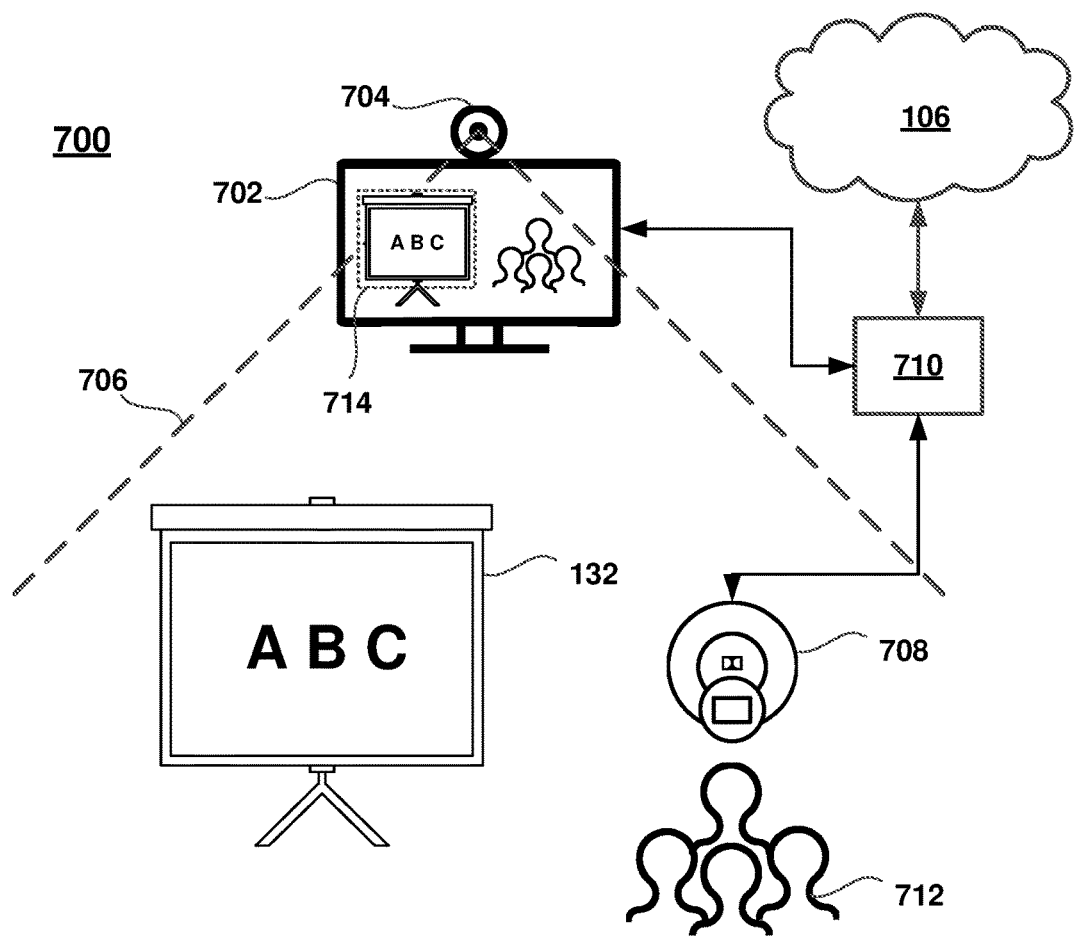
FIG. 7 shows a schematic diagram of a third example of a videoconferencing system.

In FIG. 7, another exemplary videoconferencing system 700 is shown.

The system 700 comprises a videoconferencing hub 710, which may comprise a videoconferencing client. The hub 710 has a network interface for communicating to other videoconferencing endpoints, e.g. for direct communication with other videoconferencing clients or to a videoconferencing server that manages communication between two or more videoconferencing clients connected thereto. The network interface communicates via the data communication network 106.

The system 700 further comprises a display 702, such as but not limited to a television, which is connected to the hub 710 for receiving images therefrom.

The system 700 further comprises a camera 704 having a whiteboard 132 (or other physical writing surface) in its field of view 706. The camera 704 may be fixed to the display, e.g. to the top of the display. The camera 704 may be incapable of any kind of motorized panning, such that its field of view 706 is generally fixed. It may be capable of optical and/or digital zoom. Depending on the position of the whiteboard 132 within the field of view, the image thereof as captured by the camera 704 may be rectangular or non-rectangular (due at least to perspective). The camera 704 is connected to the hub 710, for sending captured images to the hub 710, and optionally for receiving control data from the hub 710. The camera 704 may also be connected to the display 710, for sending captured images directly to the display 710.

The system 700 further comprises a phone 708. The phone 708 is connected to the videoconferencing hub 710, with audio signals and control data being communicated therebetween. The connection may be a direct connection, e.g. a wired ethernet connection. The phone 708 may have a network interface for communicating with the videoconferencing hub 710 via the data communication network 106. The phone 708 may be a dedicated device that is intended to be a permanent component of the videoconferencing system, e.g. a conference phone. The conference phone may be hardwired to a local power supply and perhaps to the data communication network 106. Alternatively, the phone 708 may be a shared purpose device, e.g. a smart phone or tablet computer which is brought along to configure the videoconferencing system and/or to be used during a video conference provided by the videoconferencing system.

The system 700 further comprises a control system, which may be located in one of, or distributed across two or more of, the display 702, the camera 704, the phone 708 and the hub 710. Typically, the control system is located mostly in the hub 710. The control system is configurable during a setup phase, during which it performs a sequence of steps which will now be described with reference to FIGS. 8 and 9. Note that the steps need not be performed in the order in which they are described, and they need not be performed sequentially.

The sequence of steps comprises a step S902 of capturing at least one image using the camera 704. A stream of video images may be captured.

The sequence of steps comprises a step S904 of rendering the captured image(s) on the display 702. This step allows a user to see what falls within the field of view 706 of the camera 704. At this point the user may, for example, rearrange the furniture and perhaps the whiteboard within the field of view 706.

The sequence of steps comprises a step S906 of obtaining via the phone a user selection of a region of the at least one image, the region comprising an image of the whiteboard. The obtaining step S906 comprises a method 1000 of enabling the user to set, via the phone, at least one of the size, shape or position of a representation of the region in the at least one image rendered on the display. The method 1000 will be described below, with reference to FIG. 10.

The sequence of steps ends with a step S908 of saving a whiteboard location to memory, the saved whiteboard location corresponding to the selected region. No specific manner of saving the whiteboard location is essential; for example, the saved location may be in the form of a central point, a central point and longest dimension, four corners of a rectangle, etc.

Figure 8:
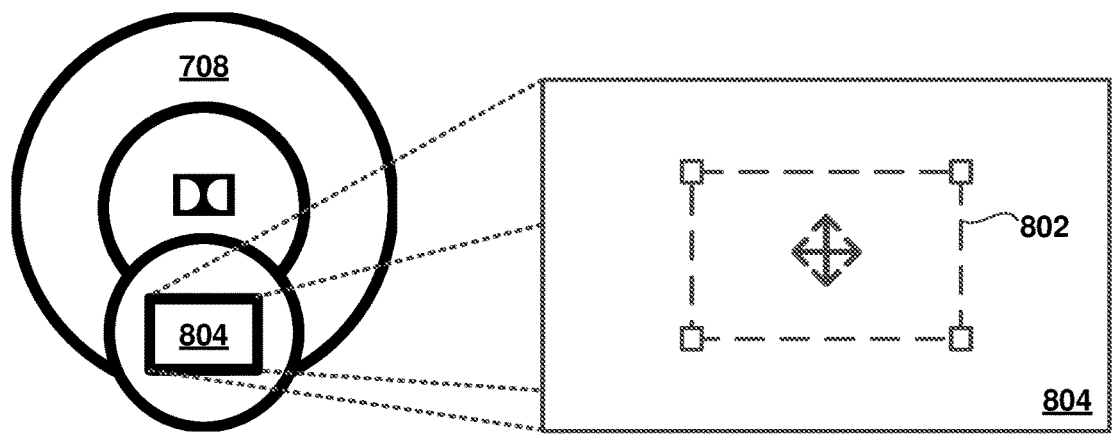
FIG. 8 shows a schematic diagram of a conference phone of the third example videoconferencing system, emphasizing a touchscreen of the conference phone.
Figure 9:
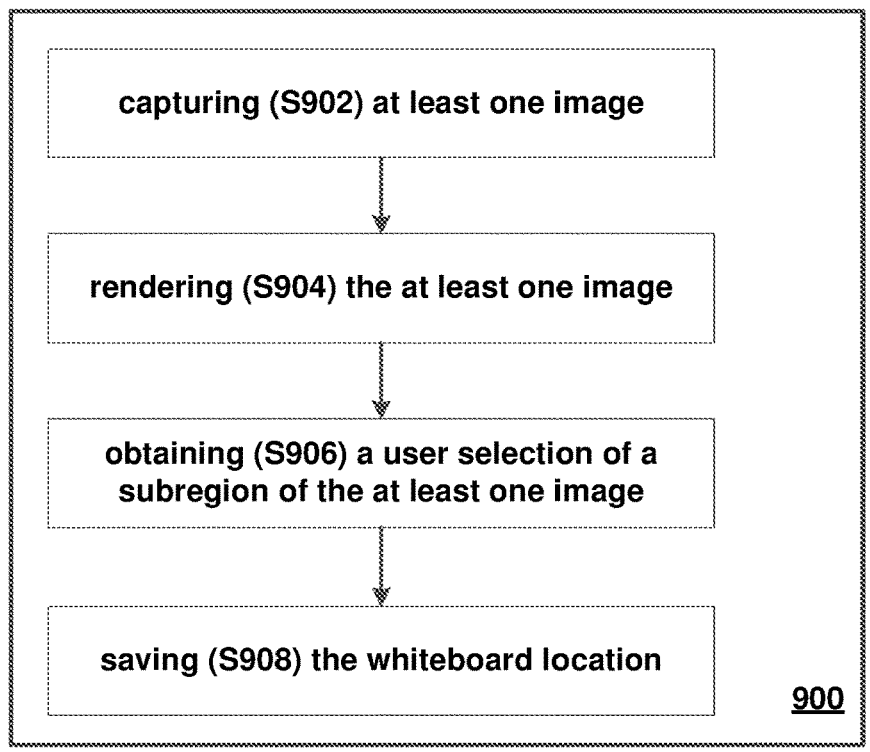
FIG. 9 shows a flow diagram of an example of a method for configuring the third example videoconferencing system, during a setup phase.
Figure 10:
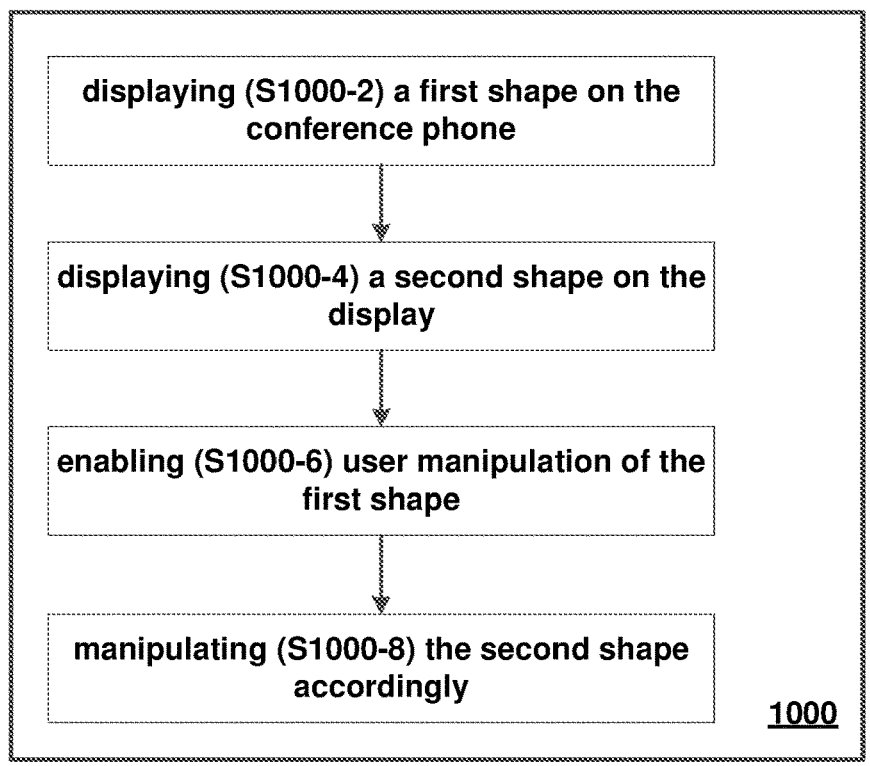
FIG. 10 shows optional processing steps for the method of FIG. 9.

Referring to FIG. 10, the method 1000 of enabling the user to set said at least one of the size, shape or position of the representation of the region comprises a series of steps which will now be described also with reference to FIGS. 7 and 8. Note that the steps need not be performed in the order in which they are described, and they need not be performed sequentially.

The series of steps comprises displaying S1000-2 a first shape 802 (see FIG. 8) on a touchscreen 804 of the phone 708, the first shape being representative of a pre-selection of the region. For example, as shown, the first shape may be a rectangle.

The series of steps comprises displaying S1000-4 a second shape 714 on the display 702 (see FIG. 8), the second shape corresponding to the first shape. Typically, the first and second shapes are of the same shape, and the second shape is larger since it is rendered on the display 702.

The series of steps comprises enabling S1000-6 the user, via the touchscreen, to perform a manipulation of the first shape 802. For example, the first shape may be movable, e.g. draggable, so as to occupy a different region of the at least one image. Certain points on the first shape, such as its corners, may be draggable in order to change its size and/or shape.

The series of steps comprises manipulating S1000-8, by the control system, the second shape 714 according to the manipulation of the first shape 802. In practice, therefore, the user-manipulation of the first shape on the phone is mirrored in the rendering of the second shape on the display.

Following this setup phase, the position of the whiteboard within the field of view of the camera is saved, which makes it simple for users of the system to share images of the whiteboard with other videoconference participants during a videoconference, as will be described below. The control system is configured to perform, during a videoconference, a series of steps that will now be described with reference to FIGS. 11 and 12. Note that the steps need not be performed in the order in which they are described, and they need not be performed sequentially.

The series of steps comprises providing 1102 via the phone a share-writing-surface soft button, the selection of which generates a share-writing-surface instruction. This may be a soft button rendered on the touchscreen 804 of the phone 708.

The series of steps comprises receiving S1104 via the phone the share-writing-surface instruction.

The series of steps comprises accessing S1106 the saved whiteboard location. This step may be performed in advance of receiving the share-writing-surface instruction, e.g. at the beginning of a videoconference, or at some other earlier time.

The series of steps comprises performing S1108 a geometric transform on the non-rectangular image of the whiteboard, whereby a substantially rectangular image of the whiteboard is generated. This may include a pre-step of determining whether the image of the whiteboard is non-rectangular, and then performing the geometric transform only if the image of the whiteboard is non-rectangular.

Figure 12:
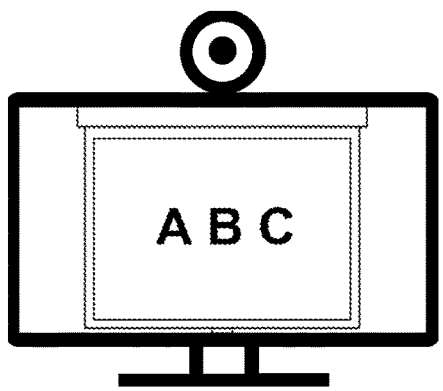
FIG. 12 shows a schematic diagram of a display on which is rendered an image of a whiteboard as shared in accordance with the method shown in FIG. 11.

The series of steps comprises magnifying S1110 the image of the whiteboard so that it occupies at least a majority of the pixels of video frames of an output stream of video frames e.g. as shown in FIG. 12.

The series of steps comprises performing S1112 whiteboard enhancement processing on the image of the whiteboard.

Figure 11:
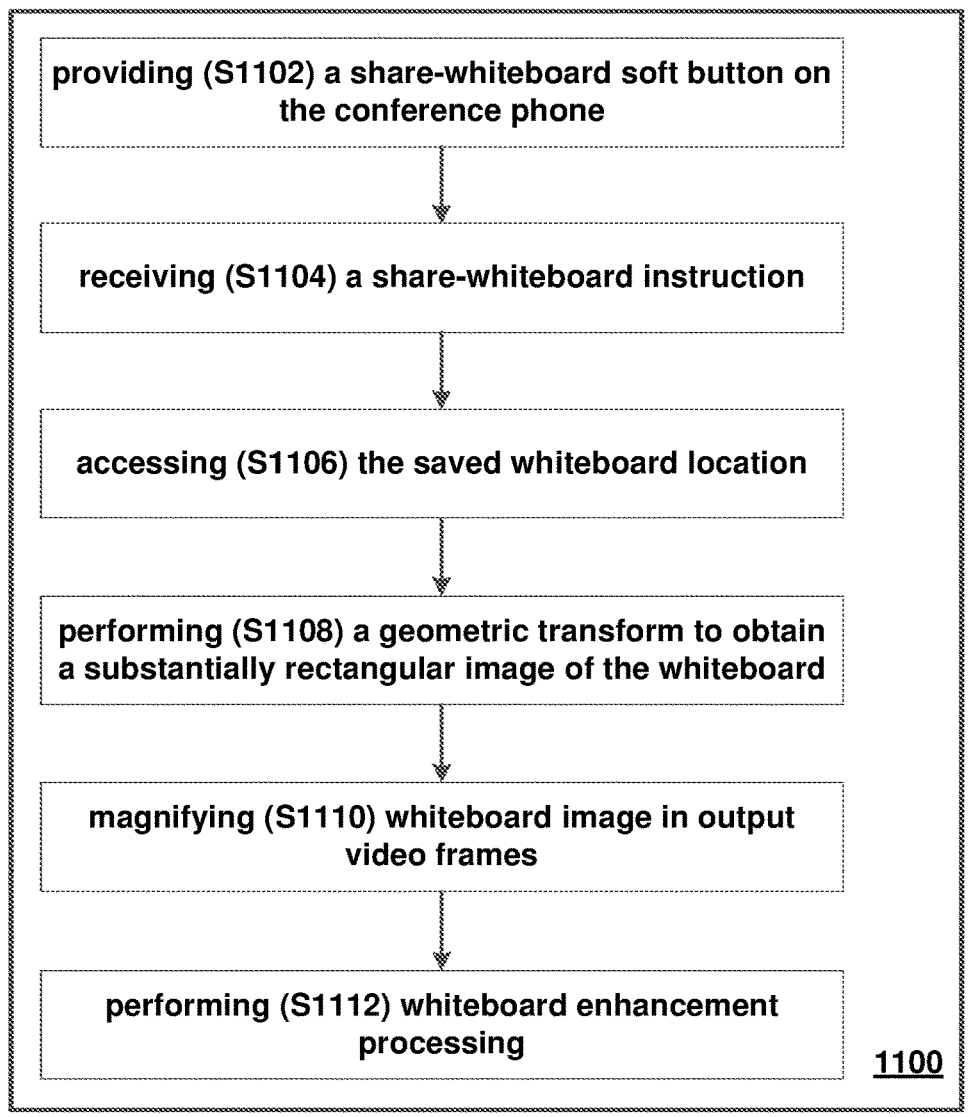
FIG. 11 shows a flow diagram of an example of a method for using the third example videoconferencing system to share images of a whiteboard or other writing surface during a videoconference.

Of the steps shown in FIG. 11, at least said magnifying S1110 is responsive to the share-writing-surface instruction.

Various aspects of the present invention may be appreciated from the following enumerated example embodiments (EEEs):

EEE A1. A videoconferencing system, comprising:
a videoconferencing endpoint, comprising:
  a network interface for communicating via a data communication network with at least one of a videoconferencing server and a videoconferencing client; and
  a first video interface comprising a video interface input connector for connecting a computer to the videoconferencing endpoint for receiving an input video signal from the computer for screen sharing,
wherein the videoconferencing endpoint is configured to communicate video data corresponding to the input video signal received via the video interface input connector to the at least one of the videoconferencing server and the videoconferencing client via the network interface, and
a computing apparatus, comprising:
  a display controller for generating an output video signal for output on a display;
  a second video interface comprising a video interface output connector connected to the display controller and adapted for output of the output video signal generated by the display controller; and
  a processor,
wherein the computing apparatus is connected to a camera for capturing a sequence of video frames of a physical writing surface, and the processor is configured to generate processed video data by applying to the sequence of video frames of the physical writing surface captured by the camera a video enhancement process to enhance legibility of pen strokes on the physical writing surface, the video interface output connector of the computing apparatus is connected to the video interface input connector of the videoconferencing endpoint, and the computing apparatus is configured to output an enhanced video signal corresponding to the processed video data via the video interface output connector.

EEE A2A. The system of EEE A1, wherein the first and second video interfaces both are an HDMI interface, an S-video interface, a DVI interface, a composite video interface, a component video interface, a displayport interface, a FireWire interface, a VGA interface or a SCART interface.

EEE A2B. The system of EEE A1, wherein at least one of: the first video interface comprises a wireless interface; or the second video interface comprises a wireless interface.

EEE A3. The system of EEE A1, A2A or A2B, wherein the computing apparatus is a screen-less device.

EEE A4. The system of EEE A3, wherein the computing apparatus comprises a dongle.

EEE A5. The system of any of the EEEs A1-A4, wherein the processor of the computing apparatus is configured to:
  receive the sequence of video frames from the camera;
  for each current video frame of the sequence of video frames:
    generate a pen stroke mask by applying adaptive thresholding;
    generate an output video frame using the pen stroke mask.

EEE A6. The system of EEE A5, wherein the processor of the computing apparatus is configured to,
  for each current video frame of the sequence of video frames:
    generate an intermediate mask by applying adaptive thresholding to the current video frame;
    determine a smoothed mask by temporal smoothing the intermediate masks of a predetermined number of video frames; and
    apply a predetermined threshold to the smoothed mask to generate the pen stroke mask.

EEE A7. The system according to EEE A5, wherein the processor of the computing apparatus is configured to, for each current video frame of the sequence of video frames:
  determine a smoothed video frame by temporal smoothing a predetermined number of video frames;
  apply adaptive thresholding to the smoothed video frame to generate the pen stroke mask.

EEE A8. The system according to EEE A5, EEE A6 or EEE A7, wherein the processor of the computing apparatus is configured to apply the pen stroke mask to the current video frame to generate a pen stroke image, and to generate the output video frame using the pen stroke image.

EEE A9. The system according to any of the EEEs A5-A8, wherein the processor of the computing apparatus is configured to, for each current video frame of the sequence of video frames, apply an image enhancement process to the current video frame to generate an enhanced video frame, and applying the pen stroke mask to the enhanced video frame to generate an enhanced pen stroke image.

EEE A10. The system according to EEE A8, wherein the processor of the computing apparatus is configured to, for each current video frame of the sequence of video frames, apply an image enhancement process to the pen stroke image to generate an enhanced pen stroke image.

EEE A11. The system according to EEE A9 or EEE A10, wherein the processor of the computing apparatus is configured to apply a color adjusting process as the image enhancement process, and optionally configured to apply a saturation adjusting process as the color adjusting process.

EEE A12. The system according to EEE A11, wherein the processor of the computing apparatus is configured to perform, histogram equalization of one or more color component of the current video frame or pen stroke image, respectively.

EEE A13. The system according to any of the EEEs A8-A12, wherein the processor of the computing apparatus is configured to, for each current video frame of the sequence of video frames:
  generate an inverted mask by inverting the pen stroke mask;
  generating a background image by applying the inverted mask to the current video frame; and
  adding the background image to the pen stroke image or the enhanced pen stroke image respectively.

EEE A14. The system according to EEE A13, wherein the processor of the computing apparatus is configured to, for each current video frame of the sequence of video frames, generate the output video frame as a weighted sum of at least:
  the enhanced pen stroke image or the pen stroke image; and
  the current video frame or the smoothed mask or the pen stroke mask.

EEE A15. A method for sharing content written on a physical writing surface, using a videoconferencing endpoint having a video interface input connector for sharing a computer screen, the method comprising:
providing a computing apparatus connected to a camera for capturing a sequence of video frames of the physical writing surface, the computing apparatus comprising a display controller for generating an output video signal, a video interface output connector connected to the display controller and adapted for output of the output video signal generated by the display controller, and a processor;
connecting the video interface output connector of the computing apparatus to the video interface input connector of the videoconferencing endpoint;
generating, using the processor of the computing apparatus, processed video data by applying a video enhancement process to enhance legibility of the content written on the physical writing surface to the sequence of image frames of the physical writing surface captured by the camera; and
output, using the computing apparatus, an enhanced video signal corresponding to the processed video data, thereby transmitting the enhanced video signal to the videoconferencing endpoint via the video interface output connector of the computing apparatus and the video interface input connector of the videoconferencing endpoint.

EEE B1. A method of processing of a sequence of video frames from a camera capturing a writing surface for subsequent transmission to at least one of a remote videoconferencing client and a remote videoconferencing server, the method comprising:
receiving the sequence of video frames from the camera;
for each current video frame of the sequence of video frames:
generating a pen stroke mask by applying adaptive thresholding;
generating an output video frame using the pen stroke mask.

EEE B2. The method according to EEE B1, wherein the processing is performed real-time.

EEE B3. The method according to EEE B1 or EEE B2, further comprising for each current video frame of the sequence of video frames:
generating an intermediate mask by applying adaptive thresholding to the current video frame;
determining a smoothed mask by temporal smoothing the intermediate masks of a predetermined number of video frames; and
applying a predetermined threshold to the smoothed mask to generate the pen stroke mask.

EEE B4. The method according to EEE B1 or EEE B2, further comprising for each current video frame of the sequence of video frames:
determining a smoothed video frame by temporal smoothing a predetermined number of video frames;
applying adaptive thresholding to the smoothed video frame to generate the pen stroke mask.

EEE B5. The method according to any of the EEEs B1-B4, wherein the step of generating the output video frame using the pen stroke mask comprises applying the pen stroke mask to the current video frame to generate a pen stroke image.

EEE B6. The method according to any of the EEEs B1-B5, wherein the step of generating the output video frame using the pen stroke mask comprises applying an image enhancement process to the current video frame to generate an enhanced video frame, and applying the pen stroke mask to the enhanced video frame to generate an enhanced pen stroke image.

EEE B7. The method according to EEE B5, wherein the step of generating the output video frame comprises applying an image enhancement process to the pen stroke image to generate an enhanced pen stroke image.

EEE B8. The method according to EEE B6 or EEE B7, wherein the image enhancement process comprises a color adjusting process, and optionally the color adjusting process comprises a saturation adjusting process.

EEE B9. The method according to EEE B8, wherein the color adjusting process comprises performing histogram equalization of one or more color component of the current video frame or pen stroke image, respectively.

EEE B10. The method according to any of the EEEs B5-B9, wherein the step of generating the output video frame comprises:
generating an inverted mask by inverting the stroke mask;
generating a background image by applying the inverted mask to the current video frame; and
adding the background image to the pen stroke image or the enhanced pen stroke image respectively.

EEE B11. The method according to any of the EEEs B5-B10, wherein the step of generating the output video frame comprises, calculating a weighted sum of at least: A) the pen stroke image or the enhanced pen stroke image; and B) the current video frame or the smoothed mask or the pen stroke mask.

EEE B12. The method according to EEEs B10 and B11, wherein the step of generating the output video frame comprises, calculating a weighted sum of at least: A) the pen stroke image or the enhanced pen stroke image added to the background image; and B) the current video frame or the smoothed mask or the pen stroke mask.

EEE B13. Computer program product having instructions which, when executed by a computing device or system, cause said computing device or system to perform the method according to any of the EEEs B1-B12.

EEE B14. A data-processing system configured to perform the method according to any of the EEEs B1-B12.

EEE B15. The data-processing system of EEE B14, embodied as a laptop equipped with a webcam for capturing the sequence of video frames, the laptop comprising a network interface for communicating via a data communication network with at least one of a videoconferencing server and a videoconferencing client, wherein the laptop is configured to generate processed video data by performing the method according to any of the EEEs B1-B12 and to communicate said processed video data to the at least one of the videoconferencing server and the videoconferencing client via the network interface.

EEE B16. A videoconferencing device configured to:
receive a sequence of video frames of a physical writing surface captured by a camera;
selecting an image area of interest in the video frames, comprising selecting one of a sub-area of the video frames and an entire area of the video frames;
for each current video frame of the sequence of video frames:
generating a pen stroke mask by applying adaptive thresholding to the image area of interest;
generating an output video frame using the pen stroke mask.

The invention claimed is:

1. A videoconferencing system comprising:
a display;
a camera having a physical writing surface in its field of view;
a phone; and
a control system configured to perform, during a setup phase, the following steps:
capturing at least one image using the camera;
rendering the at least one image on the display;
obtaining via the phone a user selection of a region of the at least one image, the region comprising an image of the physical writing surface; and
saving a physical writing surface location to memory, the saved physical writing surface location corresponding to the region,
wherein obtaining the user selection of the region comprises enabling the user to set, via the phone, at least one of the size, shape or position of a representation of the region in the at least one image rendered on the display, including:
displaying a first shape on a touchscreen of the phone, the first shape being representative of a pre-selection of the region;
displaying a second shape on the display, the second shape corresponding to the first shape;
enabling the user, via the touchscreen, to perform a manipulation of the first shape; and
manipulating the second shape according to the manipulation of the first shape.

2. The videoconferencing system of claim 1, wherein the control system is configured to perform, during a videoconference, the following steps:
receiving via the phone a share-writing-surface instruction;
accessing the saved physical writing surface location; and
magnifying the image of the physical writing surface so that it occupies at least a majority of the pixels of an output stream of video frames,
wherein at least said magnifying is responsive to the share-writing-surface instruction.

3. The videoconferencing system of claim 2, wherein the control system is configured to perform, during the videoconference, the following further step:
performing a geometric transform on the image of the physical writing surface, whereby a substantially rectangular image of the physical writing surface is generated.

4. The videoconferencing system of claim 2, wherein the control system is configured to perform, during the videoconference, the following further step:
performing enhancement processing on the image of the physical writing surface.

5. The videoconferencing system of claim 2, wherein the control system is configured to perform, during the videoconference, the following further step:
providing via the phone a share-writing-surface soft button, the selection of which generates the share-writing-surface instruction.

6. The videoconferencing system of claims 1, wherein the display includes at least one of: a television; a computer monitor; or a projector system, comprising a projector and a screen.

7. A method performed by a videoconferencing system that includes one or more processors, the method comprising:
capturing at least one image using a camera;
rendering the at least one image on a display;
obtaining, via a user interface, a user selection of a region of the at least one image, the region comprising an image of a physical writing surface within the field of view of the camera; and
saving a physical writing surface location to memory, the saved physical writing surface location corresponding to the region, wherein obtaining the user selection of the region comprises enabling the user to set, via the user interface, at least one of the size, shape or position of a representation of the region in the at least one image rendered on the display, including:
displaying a first shape on a touchscreen, the first shape being representative of a pre-selection of the region;
displaying a second shape on the display, the second shape corresponding to the first shape;
enabling the user, via the touchscreen, to perform a manipulation of the first shape; and
manipulating the second shape according to the manipulation of the first shape.

8. A non-transitory, computer readable medium comprising instructions which, when executed by one or more processors, cause the one or more processors to perform operations comprising:
capturing at least one image using a camera;
rendering the at least one image on a display;
obtaining, via a user interface, a user selection of a region of the at least one image, the region comprising an image of a physical writing surface within the field of view of the camera; and
saving a physical writing surface location to memory, the saved physical writing surface location corresponding to the region, wherein obtaining the user selection of the region comprises enabling the user to set, via the user interface, at least one of the size, shape or position of a representation of the region in the at least one image rendered on the display, including:
displaying a first shape on a touchscreen, the first shape being representative of a pre-selection of the region;
displaying a second shape on the display, the second shape corresponding to the first shape;
enabling the user, via the touchscreen, to perform a manipulation of the first shape; and
manipulating the second shape according to the manipulation of the first shape.

* * * * *